(12) United States Patent
Nakamoto et al.

(10) Patent No.: US 6,638,573 B1
(45) Date of Patent: Oct. 28, 2003

(54) SPECTACLES FRAME SURFACE TREATMENT METHOD

(75) Inventors: Masami Nakamoto, Takarazuka (JP); Toshihisa Akaba, Tokyo (JP)

(73) Assignees: Osaka Municipal Government, Osaka (JP); Hoya Corporation, Tokyo (JP)

( * ) Notice: Subject to any disclaimer, the term of this patent is extended or adjusted under 35 U.S.C. 154(b) by 0 days.

(21) Appl. No.: 10/031,212

(22) PCT Filed: Jul. 14, 2000

(86) PCT No.: PCT/JP00/04738

§ 371 (c)(1),
(2), (4) Date: Jan. 11, 2002

(87) PCT Pub. No.: WO01/06034

PCT Pub. Date: Jan. 25, 2001

(30) Foreign Application Priority Data

Jul. 14, 1999 (JP) ............................................ 11-200199

(51) Int. Cl.[7] ................................................. B05D 3/02
(52) U.S. Cl. ............................... 427/383.1; 427/376.1; 427/376.8; 427/383.3; 427/383.7; 427/374.1; 427/398.1; 427/229; 427/380; 428/615; 428/672
(58) Field of Search .................... 427/376.1, 376.8, 427/383.1, 383.3, 383.7, 380, 374.1, 398.1, 229; 428/615, 672

(56) References Cited

U.S. PATENT DOCUMENTS 3,758,203 A * 9/1973 Lipchik et al. ................ 351/98
4,374,006 A * 2/1983 Bitzer et al. ................. 205/248

FOREIGN PATENT DOCUMENTS

| JP | 54-026247 | 2/1979 |
| JP | 57-010951 | 3/1982 |
| JP | 57010951 A * | 3/1982 |
| JP | 63-192873 | 8/1988 |
| JP | 06-192841 | 7/1994 |

OTHER PUBLICATIONS

Japanese patent abstract of 56–020191, Feb. 1981.*

* cited by examiner

Primary Examiner—Michael Barr
(74) Attorney, Agent, or Firm—Knobbe, Martens, Olson & Bear LLP

(57) ABSTRACT

As a method of treating a frame of spectacles which enables fine color modulation with ease, good reproducibility, and at low cost, there is provided a method of treating the surface of a frame of spectacles characterized in that a surface treating composition comprising a metal complex is used to form a coating layer on part or the whole of the surface of the frame of spectacles.

11 Claims, 1 Drawing Sheet

SPECTACLES FRAME SURFACE TREATMENT METHOD

This application is the U.S. National Phase under 35 U.S.C. §371 of International Application PCT/JP00/04738, filed Jul. 14, 2000, which claims priority to Japanese Patent Application No. 11/200199, filed Jul. 14, 1999. The International Application was published under PCT Article 21(2) in a language other than English.

TECHNICAL FIELD

The present invention relates to a novel method for the surface treatment of the frame of spectacles.

BACKGROUND ART

With the recent diversification of the need for design of spectacles or sunglasses, the liking for frame color has also undergone sophistication. Therefore, to meet such customers' needs, a technology for delicate modulation of frame color is required.

The hitherto-known technology for the surface treatment of the frame includes not only the plating method using a noble metal but also the ion plating method which comprises sputtering with an ionized titanium compound and the color coating method which comprises plating a substrate in advance and applying an electrodeposition coating of a colored resin, among other methods.

However, when the surface treatment is carried out by these methods, the following problems are encountered.

In the plating method, the kind of color or tone that can be obtained is limited. Moreover, the fine adjustment of tone is extremely difficult. For fine adjustment of tone, such parameters as the plating bath composition, pretreatment conditions, etc. must be strictly controlled but such delicate control is actually difficult. Therefore, it is not easy to faithfully reproduce the same color by the plating method. Furthermore, in order that the surface of only a given portion of the frame may be treated by the plating method, it is necessary to follow a time-consuming procedure comprising a masking step, a plating step, a second masking step, a second plating step, and so on.

In addition, appearance and corrosion resistance considerations require absence of pinholes in the plate formed, but this can be assured only by building up a plurality of plate layers in superim-position. On the other hand, the mere thickening of the plate leads to troubles such as cracking and peeling. Thus, generally the frame of spectacles is subjected to bending or torsional stresses in fitting and the plate layer tends to crack or peel off in the course.

The plating method generally involves a series of treatments, namely racking, cleaning, acid treatment, strike plating, baking and electroplating, which takes time and labor. Moreover, the plating method requires a large volume of liquid as well as violent or toxic chemicals so that a costly waste water treatment facility for safety disposal is required. Furthermore, the sludge treatment is also a cost item and the treatment of waste water calls for stringent control and monitoring by qualified personnel.

Furthermore, when the frame of spectacles is to be treated by the plating method, the plating conditions must be critically controlled according to the kind of frame material used. Should the plating conditions be incompatible, even in the least, with the frame material, the surface of the frame of spectacles would develop the so-called "rough skin" to detract from the marketability of the end product.

Even in the ion plating method involving a sputtering operation, fine tone control is not easy and a localized surface treatment is also difficult.

Furthermore, a vacuum furnace with a comparatively large built-in heater as well as a high voltage source is required in the ion-plating method. Since the sputtering direction is linear and the shadowed part cannot be colored, it is necessary to install a device for rotating the frame of spectacles internally of the equipment so that an increase in initial cost is inevitable. Furthermore, since the adhesion of the ion plating film is considerably dependent on the degree of cleaning of the base material, a high-precision cleaning equipment is required. Another disadvantage is that since the treating temperature in this method is comparatively high, the method cannot be applied to the frame made of copper alloy which is vulnerable to high temperature.

With the color coating method which is an electrodeposition process, fine tone control is difficult and the localized coloration of the frame is not easy. In addition, the colored resin tends to be swollen by, or partially dissolved in, commercial skin care products, hair tonics, hair dyes, and so forth.

As pointed out above, all of these surface treatment systems are not amenable to fine tone modulation and, in addition, are highly costly. Moreover, there is room for further improvement in the adhesion and sealing power of the coating layer.

BRIEF DESCRIPTION OF THE DRAWING

The diagram shows an exemplary firing profile (schedule) for the coating layer of the present invention.

DISCLOSURE OF INVENTION

Figure 1:
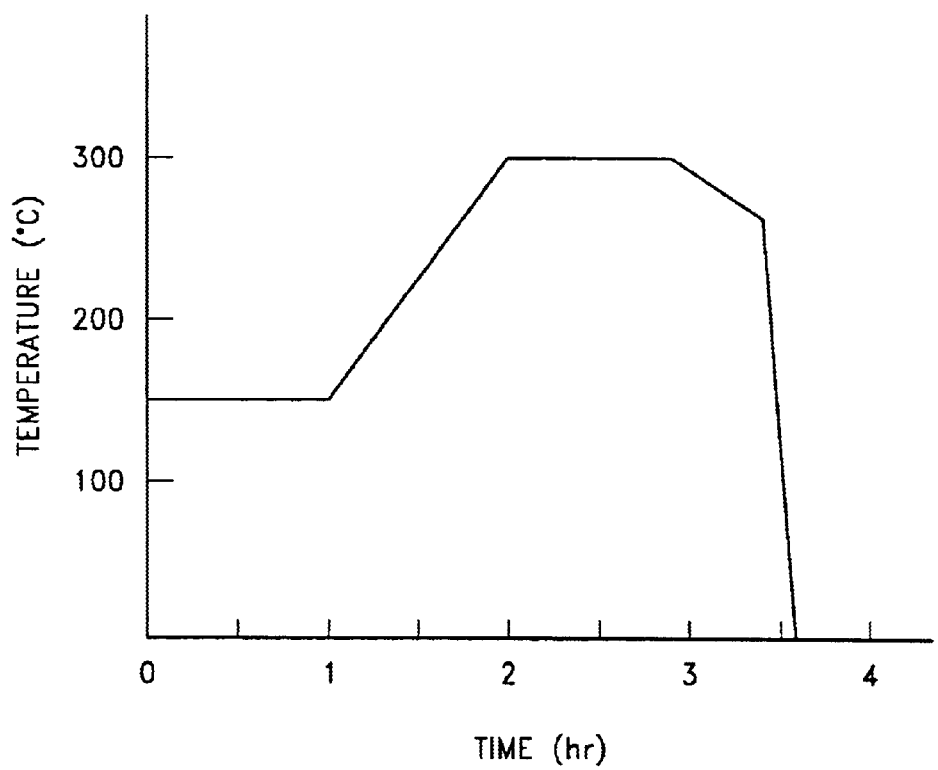

A primary object of the present invention is to provide a method of treating the surface of the frame of glasses which enables fine color modulation with ease, with high reproducibility, and at low cost, in particular.

After the intensive studies undertaken for overcoming the disadvantages of the prior art, the inventors of the present invention found that the above object can be accomplished by forming a coating layer with a surface treating composition comprising a herein-defined compound and has accordingly developed the present invention.

The present invention relates to a method of treating the surface of the frame of spectacles characterized in that a coating layer is formed on part or the whole of the surface of a frame of spectacles using a surface treating composition comprising a metal complex.

In a further aspect, the present invention is directed to a frame of spectacles subjected to a surface treatment by the above method.

The method of treating the surface of a frame of spectacles according to the present invention is characterized in that a coating layer is formed with a surface treating composition comprising a metal complex on part or the whole of the surface of the frame of spectacles.

The frame of spectacles as the substrate of the invention is not particularly restricted in kind insofar as a coating layer can be formed on at least part of the surface of the frame. Therefore, the invention can be applied to frames made of material such as metals (inclusive of alloys), synthetic resins, composite materials etc. The invention is particularly suited to the surface treatment of metal frames of glasses and can be used with particular advantage for those made of metal or alloy comprising at least one selected from titanium, copper, nickel, aluminum, gold, silver, platinum, or the like. Furthermore, the use of the frame may be for any of spectacles, sunglasses, and so on.

The frame of spectacles (hereinafter referred to sometimes as the frame) may be subjected to expedient cleaning, if necessary, prior to the treatment according to this invention. For example, the frame surface may be stripped of fouling matter with an organic solvent such as acetone, ethanol or the like in advance.

Furthermore, where necessary, the frame of spectacles may be subjected to barrel polishing prior to the treatment of the invention. The barrel polishing can be carried out by the conventional technique. In the present invention, such barreling is preferably carried out until the surface roughness (average centerline roughness) Ra has been reduced to 0.1 $\mu$m or less.

The surface treating composition for use in the present invention comprises a metal complex. That is to say, the metal complex as it is alone may be used as a surface treating agent. Moreover, where necessary, the complex may be used in combination with other ingredients. For example, a solution or dispersion of the metal complex in an organic solvent may be used with advantage for the surface treatment of the invention.

The metal complex is not particularly restricted but the known or commercial products can be used selectively according to the desired metal color, the frame material, and other variables. One species or two or more species of the metal complex can be employed. Particularly when two or more species are used in combination, the metal color can be more delicately modulated. Moreover, when two or more species of the complex are used together, the metal component or center metal of the respective complexes may be the same or different.

The metal complex can be judiciously selected according to the desired coating layer color, the frame material, and other variables. For example, the metal complex may contain metal component(s) such as gold, silver, copper, palladium, manganese, ruthenium, tin, bismuth, platinum, rhodium, zinc, titanium, chromium, manganese, iron, cobalt, nickel, iridium or the like.

The complex compound of gold, for instance, includes but is not limited to $[Au_8(PPh_3)_8](NO_3)_2$, $[Au_9(PPh_3)_8](NO_3)_3$, $[Au_2(Ph_2PCH_2PPh_2)](NO_3)_2$, $[Au_3(PPh_3)_3(C_2B_9H_9Me_2)]$, $[Au_4(PPh_3)_4]_2$, $[Au_6(PPh_3)](BF_4)_2$, $[Au_7(PPh_3)_7]$, $[Au_9(SCN)_3(PCy_3)_5]$ (Cy)=cyclohexyl), $[Au_{10}(PPh_3)_5(C_6F_5)_4]$, $[Au_{39}(SCN)_3(PPh_3)_7]$, $[Au_{13}(Ph_2PCH_2PPh_2)_6(NO_3)_4]$, $[Au_{39}(PPh_3)_{14}Cl_6]Cl_2$, $[Au_{55}(PPh_3)_{12}Cl_6]$, $Ph_3PAu(SC_6H_4$-p-t-Bu), $Ph_3PAu(SC_8H_{17})$, $Au(SC_6H_4$-p-t-Bu) $R_3PAu(SC_nH_{2n+1})$ (where R=methyl, ethyl, isopropyl or n-butyl; n=an integer of 8–24), $[Au_2\{P(CH_2)_mP\}(SC_nH_{2n+1})_2]$ (m=1 or 2, n=an integer of 8–26), $R_3PAu(SC_6H_4R')$ (R=methyl, ethyl, isopropyl or n-butyl, R'=methyl, ethyl, isopropyl or butyl), $[n-Bu_4N][Au(SC_6H_4$-p-t-Bu)$_2]$, $Ph_3PAu(SC_{18}H_{37})$, $[R_4N][Au(SC_nH_{2n+1})_2]$ (where R=ethyl or n-butyl, n=an integer of 8–18), $[R_4N][Au(S_2C_6H_3R')_2]$ (where R=methyl, ethyl or n-butyl, R'=methyl or t-butyl), and various gold resinates. In the above chemical formulas, Ph denotes —$C_6H_5$, Me denotes —$CH_3$, and Bu denotes —$C_4H_9$ (the same applies hereinafter).

Among these complex compounds of gold, gold cluster complexes and gold resinates are preferred. Gold cluster complexes are compounds having an Au-Au bond as obtainable by reducing gold organophosphine complexes and, as such, the known compounds can be used. As said gold resinates, sulfur-containing gold resinates based on balsam sulfides, for instance, can be used.

As metal complex compounds other than said gold complexes, there can be mentioned palladium complexes such as Pd(acac)$_2$ (where acac=$CH_3COCHCOCH_3$—; the same applies hereunder) and Pd(dba)$_3$ (where dba= PhCH=CHCOCH=CHPh; the same applies hereunder); rhodium complexes such as Rh(acac)$_3$, $C_{17}H_{35}COOAg$, Rh(acac)(CO)$_3$ and RhCl(PPh$_3$)$_3$; silver complexes such as Ag(O$_2$CCH$_3$), Ag(O$_2$CC$_7$H$_{15}$), Ag(O$_2$CC$_9$H$_{19}$) and Ag(S$_2$CNEt$_2$)$_2$; copper complexes such as Cu(acac)$_2$ and Cu(S$_2$CNEt)$_2$; ruthenium complexes such as [RuCl$_2$(COD)]$_n$ (where COD=1,5-cyclobutanediene (the same applies hereunder) and Ru(acac)$_3$; tin complexes such as BuSn(acac)$_2$; bis-muth complexes such as Bi(OR)$_3$ (where R=methyl, ethyl, isopropyl or t-butyl) and terpenoid resinates of bismuth; platinum complexes such as Pt(acac)$_2$, PtCl$_2$(NH$_3$)$_2$, Pt(C$_6$H$_4$O$_4$)(NH$_3$)$_2$ (where C$_6$H$_4$O$_4$ denotes cyclobutana-1,1-dicarboxylic acid) and Pt(COD)Cl$_2$; zinc complexes such as Zn(S$_2$CNR$_2$)$_2$ and Zn(NH$_2$CH$_2$CO$_2$)$_2$; acetylacetone complexes of titanium, chromium, manganese, iron, cobalt and nickel, among other metals. The above is, however, not exhaustive listing.

Furthermore, in the present invention, sulfur compounds such as the above-mentioned Ph$_3$PAu(SC$_6$H$_4$p-t-Bu), Ph$_3$PAu(SC$_8$H$_{17}$), Au(SC$_6$H$_4$-p-t-Bu), R$_3$PAu(SC$_n$H$_{2n+1}$), and Ag(S$_2$CNEt$_2$)$_2$ can also be used with advantage as said metal complex.

In the present invention, it is desirable to use metal complexes having the metal contents of not less than 20 weight %, preferably not less than 30 weight %, more preferably not less than 40 weight %. By using such metal-rich complexes, coating layers without pinholes and having good adhesion can be obtained with good reproducibility.

Referring to the case in which two or more different metal complexes are used in combination in the practice of the invention, a typical combination may for example consist of at least one gold complex (particularly selected from the group consisting of gold cluster complexes and gold resinates, more preferably gold cluster complexes) as the main ingredient (coloring agent) and at least one complex compound of a metal selected from the group consisting of cobalt, copper, zinc, ruthenium, rhodium, palladium, manganese, silver, tin, platinum, iridium and bismuth as a color modulating agent. In such cases, delicate color adjustments can also be made particularly by varying the formulating ratio of the gold complex and color modulating agent. For example, by varying the formulating ratio of a gold complex and a palladium complex, the frame color can be modulated along a continuum from golden tone to platinum tone, thus giving a delicate assortment of color frames.

The formulating ratio of said main ingredient and color modulating agent can be judiciously adjusted according to the desired color tone and the kind of metal complex used, among other variables. For example, when a gold complex is used as the main ingredient, the weight ratio (M/Au) of the metal component (M) of the color modulating agent to gold (Au) content of the ingredient may for example be usually about 0.05–1.0. However, a deviation from the range is acceptable unless the effect of the invention is compromised thereby.

The organic solvent is not particularly restricted, but can be properly selected according to the kind of metal complex used, the frame material, and so on. For example, terpenoids such as dipentene, dipentene oxide, limonene, palantan, pinene, terpene dimer, Dimal H, pine oil, terpineol, dihydroterpineol, etc.; essential oils such as lavender oil, rosemary oil, anise oil, lemon oil, orange oil, rosemary oil, sassafras oil, wintergreen oil, fennel oil, turpentine oil, etc.; and various organic solvents such as methyl ethyl ketone, methyl isobutyl ketone, cyclohexane, cyclohexanone, ethyl acetate, butyl acetate, amyl acetate, benzyl acetate, diethylene glycol monobutyl ether, butanol, nitrobenzene, toluene, xylene, hexane, tetrahydrofuran, acetonitrile, petroleum ether, chloroform, carbon tetrachloride, isopropyl alcohol, etc. can be employed. These may be used each independently or two or more of them may be used in combination.

In addition to the above ingredients, various additives may also be formulated, where necessary. For example, a viscosity modifier, such as rosin, balsam, wax, cellulose, etc., can be used. Moreover, unless the effect of the invention is compromised, various resins such as alkyd resin, epoxy resin, acrylic resin, polyvinyl butyral resin, etc. can be used. It is preferred that the amount of resins should generally be less than 10 weight %, particularly not more than 5 weight %. When the resin content is high, pinholes tend to occur and, in addition, a heat treatment at a high temperature becomes necessary. It is, therefore, the most preferable that the surface treating composition according to the invention should be substantially free of resins.

In dissolving or dispersing the metal complex in said organic solvent, the concentration of the metal complex can be judiciously varied according to the kind of metal complex and the kind of organic solvent, among other variables, but usually the concentration may be adjusted to be about 3–20 weight %, preferably 10–20 weight %, in terms of the center metal.

The method of coating with the surface treating composition is not particularly restricted insofar as a coating layer can be formed in part or the whole of the surface of the frame of spectacles and, for this purpose, the known coating techniques can be utilized. For example, any of the dipping, brush coating, roller coating, spray coating, screen printing and so on can be employed. The coating amount can be judiciously selected according to the frame material, the kind of end product, etc. and is usually so set that the thickness of the coating layer on the end product will be about 0.2–1 μm. It should be understood that a deviation from the above range is acceptable unless the effect of the invention is compromised.

The coating may be performed in a single step or in two or more steps. In the present invention, depending on the formulation of the surface treating composition, an adequate coating layer may be obtained by a single coating operation. When coating is to be carried out in two or more steps, a cycle consisting of a first coating session, a drying session, and a second coating session, for instance, may be employed. An alternative cycle may consist of a first coating session, a drying session or a heat treatment, and a second coating session.

Where necessary, each coating step may be followed by a drying step. The method of drying is not particularly restricted, either, but may be whichever of spontaneous drying and forced drying. The drying temperature is not restricted, either, but usually a suitable temperature may be selected with the range up to 120° C.

Furthermore, it is preferable that the drying operation may be followed by a heat treatment, usually at a temperature not higher than 450° C. Insofar as the peak temperature is limited to 450° C. (preferably not higher than 400° C., more preferably not higher than 350° C.), the method of heat treatment is not particularly restricted but may be suitably selected according to the frame material and the desired color, among other variables.

In the method of the present invention, the heat treatment is preferably carried out in such a manner that the frame of spectacles is first heated and maintained at 100–250° C. (preferably 120–170° C.) and, then, further heated and held at 280–450° C. (preferably 280–320° C.). The hold (dwell) time at each stage (temperature) can be judiciously selected according to the temperature used, the frame material, and other factors. Usually, the hold time can be set within a certain range not less than 0.5 hour. Particularly in the method of the invention, the heat treatment is preferably carried out in such a manner that the frame of spectacles is preliminarily heated and maintained at 120–170° C. for 1 hour, then further heated and maintained at 280–320° C. for 1 hour, and finally allowed to cool (spontaneous cooling).

More particularly, the frame of spectacles is first heated and maintained at 120–170° C. for 1 hour, at the end of which time the temperature is raised to 280–320° C. over 1 hour period. After this temperature (peak temperature) is maintained for 1 hour, it is lowered to 20–70° C. over 1 hour period and the frame of spectacles is then taken out of the furnace and allowed to cool to room temperature (20° C.). An exemplary firing profile (schedule) according to this protocol is shown in the figure. In this example, the protocol comprises heating the frame of spectacles to 150° C. in advance, holding it at this temperature for 1 hour, heating it further to 300° C. over 1 hour period, maintaining it at 300° C. for 1 hour, then causing the temperature to fall to 40° C. over 1 hour period, and finally allowing the frame of spectacles to cool. This cooling may be spontaneous cooling within the furnace or out of the furnace.

In the method of the invention, a particularly meritorious coating layer can be obtained by conducting the heat treatment according to the above schedule. Thus, for example, a coating layer as thin as 1 μm or less (particularly 0.8 μm or less) and showing good adhesion can be obtained with improved reproducibility. Moreover, in the present invention, the color matching of the coating layer can also be made according to the temperature of heat treatment. For example, when a surface treating composition comprising a gold complex and a palladium complex is used as said metal complex, a coating layer leaning more heavily on gold tone than on platinum tone can be obtained by increasing the temperature of heat treatment.

The atmosphere in which the frame of spectacles is heat-treated is not particularly restricted but may be whichever of atmospheric air, an inert gas or the like, and can be judiciously selected according to the use of the end product, among other factors.

In the heat treatment, the frame coated with the surface treating composition is preferably supported on a mesh-type jig. Thus, in the method of the invention, the frame of spectacles need only be placed on a mesh-type jig and, unlike in the plating method, does not require racking. Whereas, in the case of racking, there are risks for the part of the frame which is directly supported by the rack being incompletely coated, this disadvantage is obviated when the frame is heat-treated on a mesh jig. The mesh-type jig is not particularly restricted insofar as it is sufficiently heat-resistant to withstand the heat treatment of the invention and does not react with the frame of spectacles. Thus, for example, a screen of stainless steel (mesh size: ca 1 cm×ca 1 cm) can be used as said mesh-type jig. This jig can be used in said drying operation as well. When a mesh jig is used, the rheology of the surface treating composition is preferably adjusted in advance.

The coating layer formed by the method of the invention may exist as alloyed, or not alloyed, with at least part of the frame so long as it does not adversely effect the adhesion property, coloring power and so on. Thus, the invention covers both of the occasions.

In the present invention, the coating layer formed in the above manner may optionally be topped by a clear coating, where necessary. The paint which can be used for this clear coating includes but is not limited to acrylic, melamine, urethane and epoxy clear paints. These may be known clear paints or commercial clear paints. The clear coating technology which can be used may also be the known one, thus including electrodeposition coating, spray coating, brush coating, roller coating and so on.

The frame of spectacles according to the present invention is a frame subjected to a surface treatment by the above-described method of the invention. Thus, the frame of spectacles according to the invention has a coating layer comprising a metal compound as a main ingredient. Preferably this coating layer satisfies the requirements of the tests (1)–(3) to be described hereinafter.

In accordance with the method of the invention, which as aforesaid comprises coating a substrate with a surface treating composition comprising a metal complex, fine color modulations can be made with comparative ease by varying the formulation of the surface treating composition (the kind and concentration of the metal complex), the thickness of the coating layer, and the temperature of heat treatment, among other parameters.

Moreover, in accordance with the method of the invention wherein the frame can be colored by coating with a surface treating composition, localized coloration can also be made easily. In order to achieve localized coloration by the plating technology, the state of the art requires a time-consuming production procedure involving multiple masking and multiple plating but these are not necessary in the present invention.

The coating layer formed by the method of the present invention has sufficient adhesion to withstand adjustments in fitting. Moreover, since the incidence of pinholes is suppressed or even inhibited, a good sealing and, hence, effective corrosion inhibition can be insured. Thus, the coating layer according to the present invention is not only advantageous in terms of the color effect referred to above but also has the adhesion and sealing effect required of a frame of spectacles, so that it has a very high practical utility.

Furthermore, unlike the plating and other prior art methods, the method of the present invention does not require large-scale equipment, thus being quite advantageous costwise. In addition, compared with the plating and color coating methods, the method of the invention is superior in safety terms as well.

Thus, by the surface treatment method of the invention, the frame of spectacles can be provided with the desired color tone with ease and good reproducibility, thus offering a rich assortment of frame colors to choose from.

BEST MODE FOR CARRYING OUT THE INVENTION

The following examples are intended to delineate the features and advantages of the invention with greater clarity. It is to be understood that, of the coating layer formed in each example, the examination for pinholes, the tape peel test, and the examination for cracks were respectively carried out as follows.

(1) Examination for Pinholes

The surface of the coating layer on the frame of spectacles was examined for pinholes, both macroscopically and microscopically using a optical microscope (×60–500).

(2) Tape Peel Test

A cellophane tape was contact-bonded to the frame of spectacles and then peeled off forcefully to see whether the coating layer was stuck on the cellophane tape, both macroscopically and microscopically using a optical microscope (×60–500).

(3) Examination for Cracks

The frame of spectacles was loosely wound round a ⌀18 mm plastic rod until it had been bent by 90 degrees, and then rewound till 180 degrees to check for the development of surface cracks in the frame, both macroscopically and microscopically using a optical microscope (×60–500).

EXAMPLE 1

In 0.4 g of a mixture of terpineol and diethylene glycol monobutyl ether (1:1, by weight) was dissolved 0.3 g of the gold cluster complex $[Au_9(PPh_3)_8](NO_3)_3$ (Au content: 44 weight %) to prepare a surface treating composition. After the surface of a titanium frame was wiped with acetone-wetted cloth, this titanium frame was coated with the above surface treating composition by the brush coating technique. After drying at room temperature, the coated frame was heat-treated in an electric furnace according to the firing profile shown in the figure. The resulting titanium frame had a coating layer presenting with a golden sheen. Of this coating layer, the examination for pinholes, tape peel test, and examination for cracks were carried out. As a result, pinholes were not observed. This coating layer showed neither peeling in the tape test nor cracks on bending.

EXAMPLE 2

Except that a solution prepared by dissolving 0.3 g of the gold cluster complex $[Au_9(PPh_3)_8](NO_3)_3$ (Au content: 44 weight %) and 0.04 g of $Pd(acac)_2$ in 0.5 g of a mixture of terpineol and diethylene glycol monobutyl ether (1:1, by weight) (Pd/Au=0.11) was used as the surface treating composition, the procedure of Example 1 was otherwise repeated to perform coating of a titanium frame. The resulting titanium frame had a coating layer presenting with a golden white sheen. This coating layer was examined and tested as in Example 1. As a result, no pinholes were observed. This coating layer showed neither peeling in the tape test nor cracks on bending.

EXAMPLE 3

Except that a solution prepared by dissolving 0.3 g of the gold cluster complex $[Au_8(PPh_3)_8](NO_3)_3$ (Au content: 41 weight %) and 0.04 g of $Pd(acac)_2$ in 0.5 g of a mixture of terpineol and diethylene glycol monobutyl ether (1:1, by weight) (Pd/Au=0.11) was used as the surface treating composition, the procedure of Example 1 was otherwise repeated to perform coating of a titanium frame. The resulting titanium frame had a coating layer showing a golden white sheen. This coating layer was examined and tested as in Example 1. As a result, no pinholes were observed. This coating layer showed neither peeling in the tape test nor cracks on bending.

EXAMPLE 4

Based on the surface treating composition used in Example 2, the Pd/Au ratio was varied and the resulting change in color tone of the coating layer was investigated. The test was carried out using the ratios of 0.05, 0.07, 0.11, 0.16, and 0.2.

The coating layers of the resulting titanium frames showed a continual series of tones, namely golden white tone (Pd/Au=0.05)<(Pd/Au=0.07)<(Pd/Au=0.11)<platinum tone (Pd/Au=0.16)<palladium tone (Pd/Au=0.21). These coating layers were examined and tested as in Example 1. As a result, none of the coating layers showed pinholes. Moreover, neither peeling in the tape test nor surface cracks on bending were observed.

EXAMPLE 5

Except that a solution prepared by dissolving 0.3 g of the gold cluster complex $[Au_9(PPh_3)_8](NO_3)_3$ (Au content: 44 weight %) and 0.1 g of silver stearate $(C_{17}H_{35}COOAg)$ in 0.4 g of terpineol (Ag/Au=0.1) was used as the surface treating agent, the procedure of Example 1 was otherwise repeated to perform coating of a titanium frame. The resulting titanium frame had a coating layer having a golden tone with a faint greenish white tinge. This coating layer was examined and tested as in Example 1. As a result, no pinholes were observed. This coating layer showed neither peeling in the tape test nor cracks on bending.

EXAMPLE 6

Except that a solution prepared by dissolving 0.4 g of the gold complex $Ph_3PAu(SC_6H_4$-p-t-Bu) (Au content: 32 weight %) and 0.4 g of $Pd(acac)_2$ in 1.0 g of a mixture of terpineol and toluene (2:1 by weight) (Pd/Au=0.11) was used as the surface treating agent, the procedure of Example 1 was otherwise repeated to effect coating of a titanium frame. The resulting titanium frame had a coating layer having a golden white tone. This coating layer was examined and tested as in Example 1. As a result, no pinholes were observed. This coating layer showed neither peeling in the tape test nor cracks on bending.

EXAMPLE 7

Except that a solution prepared by dissolving 0.43 g of the gold complex $Ph_3PAu(SC_{18}H_{17})$ (Au content: 32 weight %) and 0.05 g of $Pd_2(dba)_3$ in 1.5 g of terpineol containing 10 weight % of rosin (Pd/Au =0.1) was used as the surface treating composition, the procedure of Example 1 was otherwise repeated to effect coating of a titanium frame. The resulting titanium frame had a white coating layer. This coating layer was examined and tested as in Example 1. As a result, no pinholes were observed. This coating layer showed neither peeling in the tape test nor cracks on bending.

EXAMPLE 8

Except that a solution prepared by dissolving 0.4 g of the gold thiolate complex $Au(SC_6H_4$-p-t-Bu) (Au content: 54 weight %) and 0.15 g of $Pd(acac)_2$ in 2.5 g of terpineol containing 10 weight % of rosin (Pd/Au=0.22) was used as the surface treating composition, the procedure of Example 1 was otherwise repeated to effect coating of a titanium frame. The resulting titanium frame had a golden coating layer. This coating layer was examined and tested as in Example 1. As a result, no pinholes were observed. This coating layer showed neither peeling in the tape test nor cracks on bending.

EXAMPLE 9

Except that a solution prepared by dissolving 0.36 g of the low-temperature decomposition type gold resinate (Au content: 48 weight %) and 0.03 g of $Pd(acac)_2$ in 0.17 g of terpineol (Pd/Au=0.06) was used as the surface treating composition, the procedure of Example 1 was otherwise repeated to effect coating of a titanium frame. The resulting titanium frame had a coating layer showing a golden white tone. This coating layer was examined and tested as in Example 1. As a result, no pinholes were observed. This coating layer showed neither peeling in the tape test nor cracks on bending.

EXAMPLE 10

Except that a solution prepared by dissolving 0.45 g of the low temperature decomposition type gold resinate (Au content: 48 weight %), 0.05 g of $Rh(acac)_3$, and 0.05 g of $Pd(acac)_2$ in 1.6 g of terpineol (Rh:Pd:Au=0.06:0.08:1) was used as the surface treating composition and that the heat treatment was carried out by heating from room temperature to the peak temperature of 300° C. over 30 minutes and, then, according to the firing profile illustrated in the figure, the procedure of Example 1 was otherwise repeated to effect coating of a titanium frame. The resulting titanium frame had a coating layer showing a golden white color with a faint yellowish tinge. This coating layer was examined and tested as in Example 1. As a result, no pinholes were observed. This coating layer showed neither peeling in the tape test nor cracks on bending.

EXAMPLE 11

Except that a solution prepared by dissolving 5 g of the gold thiolate complex $[n$-$Bu_4N][Au(SC_6H_4$-p-t-Bu$)_2]$ (Au content: 26 weight %) and 0.03 g of $Pd(acac)_2$ in 10 g of chloroform (Pd/Au=0.1) was used as the surface treating composition, the procedure of Example 10 was otherwise repeated to effect spray-coating of a titanium frame. The resulting titanium frame had a coating layer showing a golden white tone. This coating layer was examined and tested as in Example 1. As a result, no pinholes were observed. This coating layer showed neither peeling in the tape test nor cracks on bending.

What is claimed is:

1. A method of treating the surface of a frame of spectacles which comprises coating a surface treating composition comprising a metal complex on part or the whole of the surface of the frame of spectacles and then subjecting the frame of spectacles to a heat treatment wherein the heat treatment is carried out by heating and maintaining the frame of spectacles at 100–250° C. and then further heating and maintaining it at 280–450° C.

2. A method of treating the surface of a frame of spectacles as claimed in claim 1 wherein the heat treatment is carried out by heating and maintaining the frame of spectacles at 120–170° C. for 1 hour, then further heating and maintaining it at 280–320° C. for 1 hour, and allowing it to cool.

3. A method of treating the surface of a frame of spectacles which comprises coating a surface treating composition comprising a metal complex on part or the whole of the surface of the frame of spectacles and then subjecting the frame of spectacles to a heat treatment not exceeding 450° C., wherein, for the heat treatment, the frame of spectacles coated with the surface treating composition is set on a mesh-type jig.

4. A method of treating the surface of a frame of spectacles which comprises coating a surface treating composition comprising a metal complex on part or the whole of the surface of the frame of spectacles and then subjecting the frame of spectacles to a heat treatment not exceeding 450° C., wherein two or more species of the metal complex are used for color modulation.

5. A method of treating the surface of a frame of spectacles which comprises coating a surface treating composition comprising a metal complex on part or the whole of the surface of the frame of spectacles and then subjecting the frame of spectacles to a heat treatment not exceeding 450° C., wherein at least one gold complex and at least one metal complex of a metal selected from the group consisting of cobalt, copper, zinc, ruthenium, rhodium, palladium, manganese, silver, tin, platinum, iridium and bismuth are used as the metal complex.

6. A method of treating the surface of a frame of spectacles according to claim 1, 3, 4, or 5, wherein the surface treating composition comprises a metal complex and an organic solvent.

7. A method of treating the surface of a frame of spectacles according to claim 1, 3, 4, or 5, wherein the surface treating composition contains less than 10 weight % of resin.

8. A method of treating the surface of a frame of spectacles according to claim 1, 3, 4, or 5, wherein the metal content of the metal complex is not less than 30 weight %.

9. A method of treating the surface of a frame of spectacles according to claim 1, 3, 4, or 5, wherein at least a gold complex is used as the metal complex.

10. A method of treating the surface of a frame of spectacles according to claim 1, 3, 4, or 5, wherein at least a sulfur compound is used as the metal complex.

11. A frame of spectacles subjected to a surface treatment by the method claimed in claim 1, 3, 4, or 5.

* * * * *